J. W. CROSSLEY.
TOOL.
APPLICATION FILED NOV. 11, 1910.
1,024,120.
Patented Apr. 23, 1912.
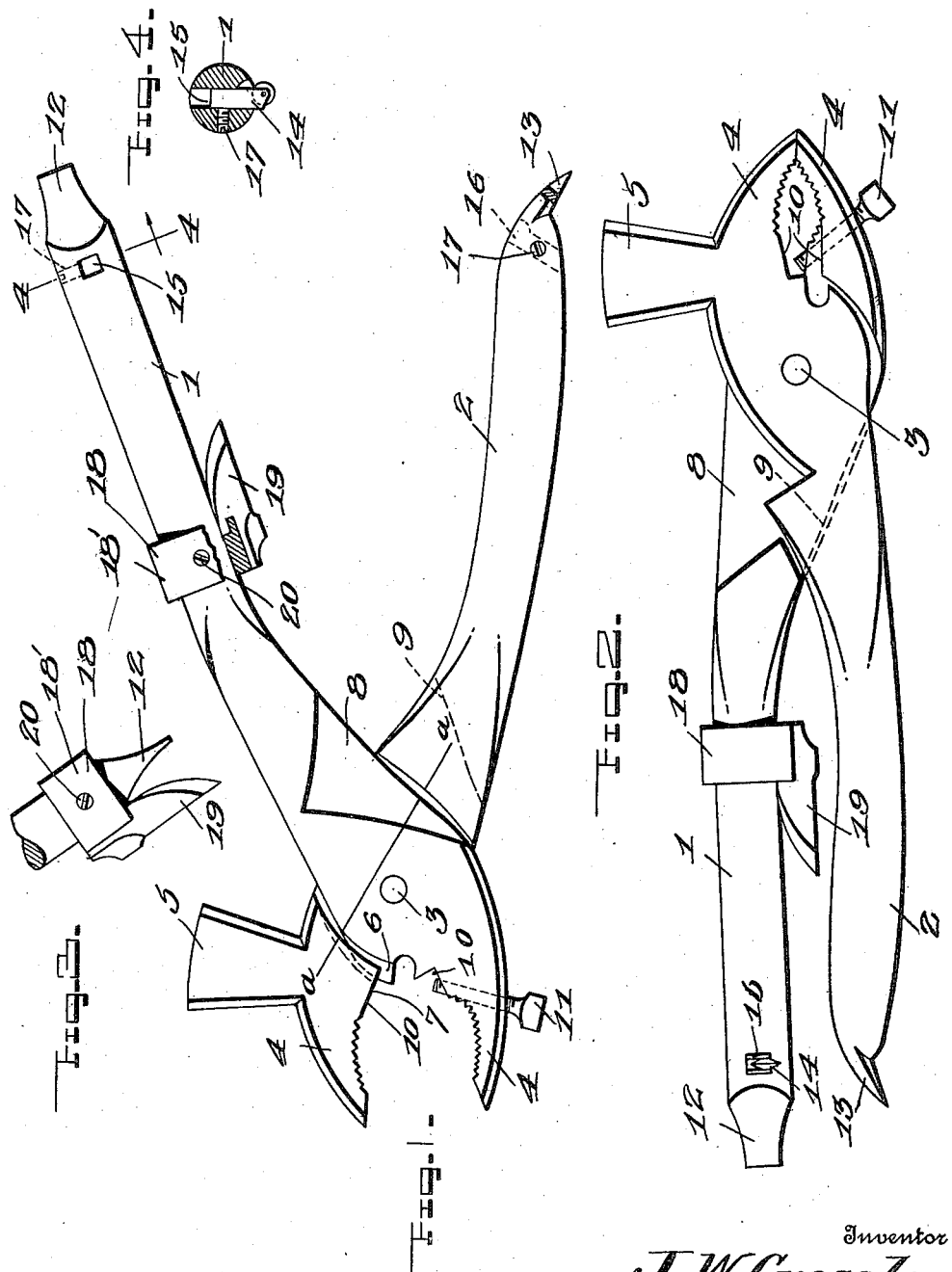
Witnesses
Inventor
J. W. Crossley
By John S. Duffie
Attorney

UNITED STATES PATENT OFFICE.

JAMES W. CROSSLEY, OF BANKS, ARKANSAS.

TOOL.

1,024,120.  Specification of Letters Patent.  Patented Apr. 23, 1912.

Application filed November 11, 1910. Serial No. 591,883.

*To all whom it may concern:*

Be it known that I, JAMES W. CROSSLEY, a citizen of the United States, residing at Banks, in the county of Bradley and State of Arkansas, have invented certain new and useful Improvements in Tools, of which the following is a specification.

My invention has relation to new and useful improvements in tools and the main object thereof is to produce a tool that is efficient in operation, inexpensive to manufacture and durable.

My invention may be used as either of the following tools: nippers, pipe wrench, hammer, monkey wrench, wire cutter, saw set, screw driver, tack puller, glass cutter, glass gage and can opener.

A further object of my invention is to provide a device, the shanks of which may be separated from each other and replaced in position in a very short space of time. When my tool is used for certain of the above purposes it facilitates matters to separate the shanks as above mentioned.

With the foregoing and other objects in view my invention consists in the novel construction, combination and arrangement of parts as described in this specification, illustrated in the accompanying drawings forming a part thereof and particularly pointed out in the claim hereunto appended.

Reference being had to the drawings: Figure 1 is a plan view of one side of my tool, the jaws of which are in open position. Fig. 2 is a plan view of the opposite side of my improved tool, the jaws being in closed position. Fig. 3 is a fragmentary side elevation of one of the shanks, when my device is being employed as a can opener. Fig. 4 is a transverse sectional view on the line 4—4 of Fig. 1 showing the position and construction of the glass cutter employed.

Referring more particularly to the drawings, in which like numerals designate like parts throughout, my invention, in detail, is described as follows: The shanks 1 and 2 are pivoted together by means of a pin 3 passing through registering perforations therein. Said shanks are each provided with a jaw 4 which jaws, in conjunction with each other, form the pipe wrench. A hammer 5 is formed integral with one of the jaws 4. The shank 1 is loosely held upon the pin 3 and may be removed from its relative position to shank 2 by opening the jaws 4 to such a point that the line a—a is continuous, when, by giving the shank or handle 1 a twist to the right, it may readily be removed.

The shanks 1 and 2 are held in engagement with each other in the following manner. The flange 6 of the shank 1 fits into a recess 7 of the jaw 4 as illustrated in Fig. 1. The reduced portion 8 of said shank 1 fits into or is received by the recess 9 of the shanks 2, when the shanks are locked together. Thus it will be seen that when it is desired to use the shanks 1 or 2 separately they may be detached from each other with quickness or readily placed in engagement with each other, when separated, and it is desired to use them conjointly.

The numeral 10 indicates the straight portions of the jaws 4 which adapt the device to be used as a monkey wrench.

The numeral 11 indicates a set screw, which screw in conjunction with the opposite jaw 4 produces a very efficient saw set.

The numeral 12 indicates the screw driver and 13 a tack puller.

The glass cutter 14 is held in one perforation 15 of the shank 1 or the perforation 16 of the shank 2 by means of a set screw 17. In Fig. 4 the glass cutter is shown ready for use, while in Fig. 1 the same is shown as it would appear when not in use.

The can opener 18 is illustrated in Fig. 1 out of operative position while in Fig. 3 said can opener is shown slid to the end of the shank 1 ready for use. The collar 18' to which the knife or cutter 19 of the can opener is secured, is held in the desired position upon the shank 1 by means of a set screw 20.

Although I have specifically described the construction, combination and arrangement of the several parts of my invention, yet I do not confine myself to such specific construction, combination and arrangement of parts but reserve and may exercise the right to make such changes therein as do not depart from the scope of the appended claim.

Having described my invention, what I claim as new, and desire to secure by Letters Patent, is:

In a tool of the nature described, two shanks pivotally held together, a pin as means whereby they are held in pivotal relation to each other, said pin extending through registering perforations in the shanks, each of said shanks provided with a jaw at its forward end, one of said shanks held in pivotal engagement with the other so that they may be separated at will, the means whereby they are held interlocked comprising a flange and reduced portion provided upon one shank, said flange and reduced portion being normally received by respective recesses in the other shank, said flange being engaged with its recess while the reduced portion is disengaged when the jaws are open to their full extent so that said shanks may be separated by a respective twisting movement.

In testimony whereof I affix my signature in presence of two witnesses.

JAMES W. CROSSLEY.

Witnesses:
 C. C. STEELMAN,
 J. D. MCFARLAND.

Copies of this patent may be obtained for five cents each, by addressing the "Commissioner of Patents, Washington, D. C."